Sept. 3, 1929.  R. V. HEUSER  1,727,060
METHOD OF MAKING DIPHENYLGUANIDINE
Filed Jan. 9, 1925
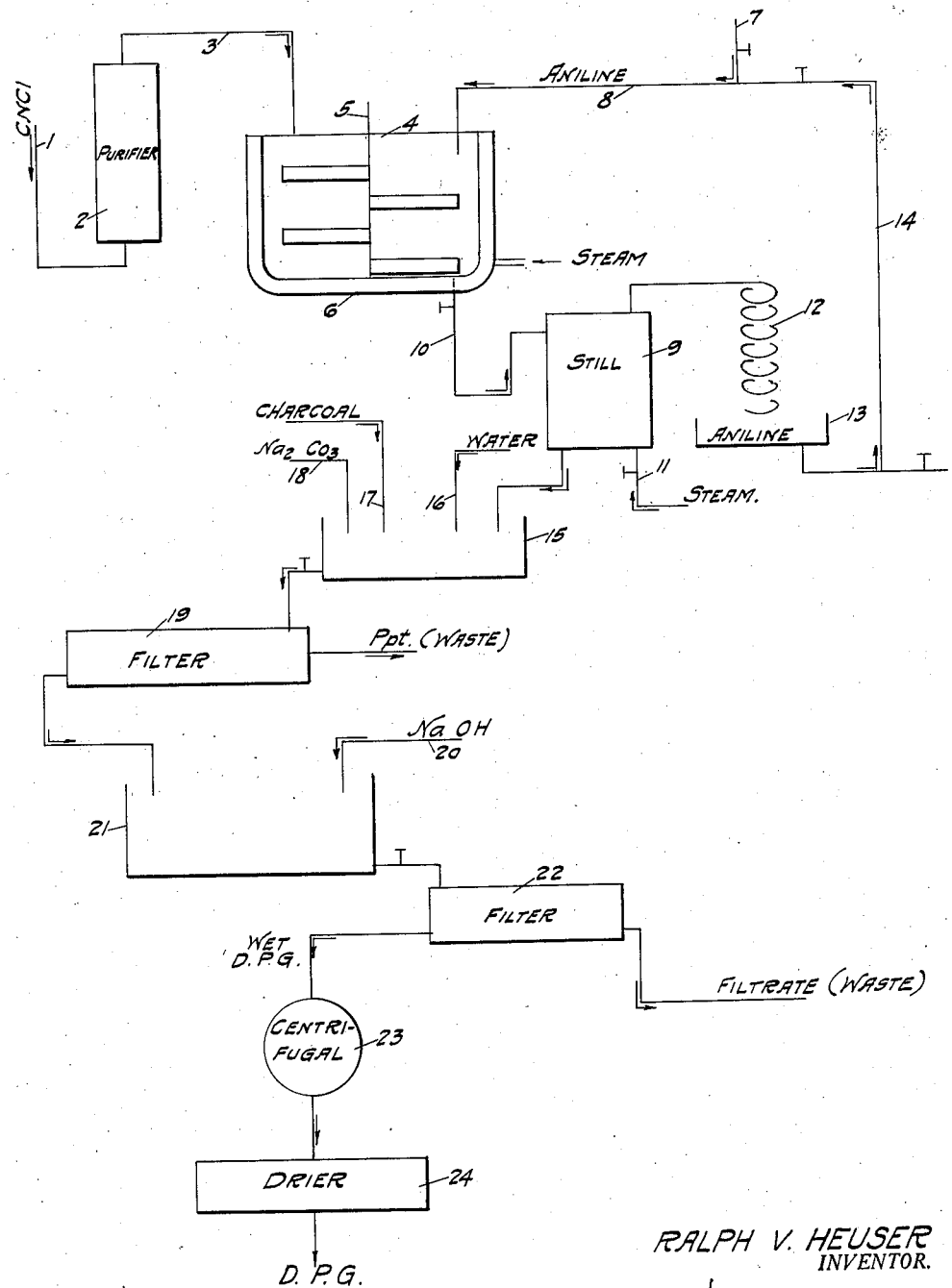
RALPH V. HEUSER
INVENTOR.
BY
ATTORNEYS.

Patented Sept. 3, 1929.

1,727,060

UNITED STATES PATENT OFFICE.

RALPH V. HEUSER, OF ELIZABETH, NEW JERSEY, ASSIGNOR TO AMERICAN CYANAMID COMPANY, OF NEW YORK, N. Y., A CORPORATION OF MAINE.

METHOD OF MAKING DIPHENYLGUANIDINE.

Application filed January 9, 1925. Serial No. 1,393.

This invention relates to the production of substitution products of aniline, more particularly to a method of making diphenylguanidine.

Heretofore, several methods of making the same have been proposed, among which is the so-called "thiocarbanilide" process, in accordance with which aniline was caused to react with carbon bisulphide and sulphur by refluxing for several hours at 35°–40° C. in the presence of alcohol, and the excess of carbon bisulphide and alcohol was distilled off. The product was added to a 75%–80% alcohol solution containing ammonia or ammonium nitrate, and the mass heated and stirred. Lead oxide (litharge) or zinc oxide were then added and the whole heated to 75° C. for about one hour and filtered. The solution was boiled to remove alcohol, heated with water to dissolve diphenylguanidine nitrate, filtered and then treated with ammonia or caustic soda to precipitate the diphenylguanidine, which was filtered, washed and dried.

This process was expensive in that it required the use of a number of ingredients which are costly, a considerable amount of the reagents used was lost, some undesirable by-products were formed and the efficiency of the reaction was not very high. The several steps of the process required close control, necessitating the employment of highly skilled technical men.

It has also been proposed to make diphenylguanidine by first forming dry cyanogen chloride gas by the interaction of mercury cyanide and chlorine under carefully controlled conditions, and then aspirating the same by means of a current of dry air into dry aniline; which was heated in the later stages of the reaction. The reaction product was dissolved in water containing some hydrochloric acid at the boiling point and filtered, and the base was then precipitated by caustic potash and filtered from the solution. To remove aniline therefrom the base was boiled with water and finally recrystallized several times from a mixture of equal parts of alcohol and water. This method was difficult to carry out since it required close control of the various steps and most of the steps required the services of trained chemists. The washing with alcohol was expensive and tedious, rendering the purification commercially unprofitable, and unless the washing was carefully done, the product was contaminated with undesirable substances which greatly decreased its value.

The present invention is intended to obviate the difficulties and disadvantages of the prior methods, it being among the objects thereof to devise a method of making diphenylguanidine which shall be simple and inexpensive, and shall not require the services of highly skilled attendants to operate the same.

In practicing this invention, cyanogen chloride in the gaseous state is first prepared, in any suitable manner, preferably in accordance with the process described in my Patent No. 1,588,731, dated June 15, 1926, for a method of preparing cyanogen chloride, which includes passing a cyanide or hydrocyanic acid solution downwardly countercurrent to chlorine gas under controlled conditions. It is highly desirable that the cyanogen chloride be free from both chlorine and hydrocyanic acid since they decrease the yield of diphenylguanidine and increase the amount of impurities therein, and this may be accomplished by very careful control of the process. However, in commercial work it is practically impossible to regulate conditions sufficiently closely to give an absolutely pure cyanogen chloride. For this reason a slight excess of chlorine is maintained in the cyanogen chloride, which automatically assures an absence of any free hydrocyanic acid, and the gas is then passed through a chamber containing moist copper or iron, or both, which combine with the chlorine. By this expedient a uniformly pure cyanogen chloride gas is readily obtained.

The gas is brought into contact with aniline which may be at room temperature or above until the reaction is substantially complete, at which stage the mass becomes very viscous or semi-solid. It is then heated to about 100° C. to melt the same and allow it to run into a still where it is subjected to distillation, preferably by steam to remove unconverted aniline therefrom. It is desirable, though not essential, to conduct the later stages of the reaction at a high temperature, say 100° C., since the time required is thereby greatly shortened and especially since the mass must be heated in order that it may flow freely into the still. After the distillation is complete, the residue, which is diphenylguanidine hydrochloride containing various impurities, must be purified.

This may be accomplished by mixing the material with a large amount of water and some activated charcoal to aid in the subsequent filtration, and then adding a dilute solution of a weak alkali, such as soda ash until the material is barely alkaline and filtering off the precipitated weakly basic impurities. At this stage there is substantially no precipitation of diphenylguanidine.

The filtrate is then added to a dilute solution of a strong alkali, such as caustic soda, slowly at first, and then increasing the additions of both the filtrate and the caustic soda solutions until the precipitation of the diphenylguanidine base is complete. It is filtered, washed, centrifuged and dried.

In the accompanying drawing constituting a part hereof, the single figure is a diagrammatic view of a system adapted for the practice of this invention.

Cyanogen chloride containing an excess of chlorine is passed through pipe 1 into the purifying tower 2 where the chlorine is removed by causing it to combine with copper or iron or both. The purified gas then flows through pipe 3 into the reaction vessel 4 fitted with a stirring device 5 and a steam jacket 6, and containing aniline which enters through pipes 7 and 8 from any suitable source and over the surface of which the cyanogen chloride flows. The stirrer 5 is slowly revolved and steam is passed into the jacket 6 to maintain a temperature in the vessel 4 of about 100° C. to complete the reaction and to keep the mass fluid. The reacted mass is then transferred to still 9 through pipe 10 and steam is injected through pipe 11, vaporizing the aniline, which is liquefied in condenser 12 and drops into the container 13. If desired the aniline may be separated from the water and with or without further purification, be added to the aniline in the vessel 4 by means of pipes 14 and 8.

The diphenylguanidine hydrochloride with basic impurities is transferred to tank 15 where it is thoroughly mixed with a large quantity of water 16 and a small amount of finely divided charcoal 17, such as "Darco," and a sufficient quantity of a weak 2.5% sodium carbonate solution 18 is added to render the solution slightly alkaline. The amount of diphenylguanidine hydrochloride in the solution should be small, say not over 4%. The material is then filtered in 19 to remove the precipitated weak bases, leaving practically nothing but diphenylguanidine hydrochloride, sodium chloride and some sodium carbonate in solution. By the term "weak alkali" used in the claims I intend to include substances having weakly alkaline reaction as well as weak solutions of stronger alkalis.

The filtered liquid is added slowly at first and then more rapidly to sufficiently dilute (appoximately 6%) caustic soda solution 20 in tank 21 to precipitate all of the diphenylguanidine base, which is practically insoluble at ordinary temperatures in very dilute caustic soda solutions containing sodium chloride, and also in water, which is used for washing the same. The material is filtered and washed in filter 22 and is then centrifuged and dried in the centrifugal 23 and drier 24, respectively.

As a result there is obtained a base of a high degree of purity with but very little manipulation. Because of the absence of chlorine and hydrocyanic acid in the cyanogen chloride gas the product does not contain impurities from decomposition products which would not only lower the yield based on the aniline used, but also increase the ash content and undesirable color in the final product. The use, successively, of weak alkali and strong alkali to first precipitate the weak bases and then the diphenylguanidine, affords a simple and inexpensive expedient for insuring the purity of the product. The apparatus required for the practice of the new method is standard and may be obtained readily and cheaply, and the efficiencies of the reactions involved are relatively high, over 80%, rendering the production of the diphenylguanidine very economical.

Although I have described the production of diphenylguanidine giving various details of manipulation, proportions of ingredients and strengths of solutions, my invention is not limited thereto, as will be apparent to those skilled in the art. For instance, the temperature of the reaction vessel may be higher or lower than 100 C., or I may dispense with heating thereof altogether. I may filter the material from tank 15 without the addition of charcoal and the amount of diphenylguanidine in the solution at this stage may be greater or less than 4%, preferably less, although I have successfully worked with solutions containing as much as 8%. The strength and character of the alkali solutions may be varied within wide limits and the order of the additions may be considerably changed. In the precipitation of diphenylguanidine with caustic soda solution I may start the precipitation with a weak (6%) solution and complete it by the addition of a much stronger, say 25%, solution of caustic soda. These and other changes may be made in the method which is not limited to the details set forth, the scope of the invention being defined in the claims appended hereto.

What I claim is:

1. A method of making diphenylguanidine which comprises bringing cyanogen chloride into reaction with aniline, subjecting the product to distillation to remove aniline therefrom and treating the product with an amount of a weak alkali sufficient to precipitate the weak bases therein but not the diphenylguanidine.

2. A method of making diphenylguanidine which comprises bringing cyanogen chloride into reaction with aniline, subjecting the product to distillation to remove aniline therefrom and treating the product with an amount of a solution of an alkali metal carbonate sufficient to precipitate the weak bases therein but not the diphenylguanidine.

3. A method of making diphenylguanidine which comprises bringing cyanogen chloride into reaction with aniline, subjecting the product to dstillation to remove aniline therefrom, treating the product with an amount of a weak alkali sufficient to precipitate the weak bases therein but not the diphenylguanidine, filtering the solution and treating the filtrate with an amount of a strong alkali sufficient to precipitate the diphenylguanidine therein.

4. A method of making diphenylguanidine which comprises bringing cyanogen chloride into reaction with aniline, subjecting the product to distillation to remove aniline therefrom, treating the product with an amount of a weak alkali sufficient to precipitate the weak bases therein but not the disphenylaguanidine, filtering the solution and treating the filtrate with an amount of caustic soda sufficient to precipitate the diphenylguanidine therein.

5. In a method of making diphenylguanidine the steps which consist in treating a solution thereof containing basic impurities with a weak alkali to precipitate said impurites but not the diphenylguanidine.

6. In a method of making diphenylguanidine the steps which consist in treating a solution thereof containing basic impurities with a weak alkali to precipitate said impurities but not the diphenylguanidine and then treating with a strong alkali to precipitate the diphenylguanidine.

7. In a method of making diphenylguanidine the steps which consist in treating a solution thereof containing basic impurities with a solution of sodium carbonate to precipitate said impurities but not the diphenylguanidine and then treating with a solution of caustic soda to precipitate the diphenylguanidine.

8. In a method of making diphenylguanidine the step which consists in treating a weak solution thereof containing basic impurities with a weak alkali to precipitate said impurities but not the diphenylguanidine.

9. In a method of making diphenylguanidine the step which consists in treating a solution containing less than 4% diphenylguanidine and having basic impurities with a weak alkali to precipitate said impurities but not the diphenylguanidine.

10. A method of purifying diphenylguanidine prepared by action of cyanogen chloride upon aniline, which comprises removing the aniline therefrom and adding to a water solution of the impure diphenylguanidine a quantity of alkali sufficient to precipitate the weak bases therein but not the diphenylguanidine.

In testimony whereof, I have hereunto subscribed my name this 6th day of January 1925.

RALPH V. HEUSER.